United States Patent [19]

Boehm

[11] 3,845,476

[45] Oct. 29, 1974

[54] MONOLITHIC MEMORY USING PARTIALLY DEFECTIVE CHIPS

[75] Inventor: Robert Francis Boehm, Wappingers Falls, N.Y.

[73] Assignee: International Business Machines Corporation, Armonk, N.Y.

[22] Filed: Dec. 29, 1972

[21] Appl. No.: 319,598

[52] U.S. Cl. ...... 340/173 BB, 340/173 R, 340/172.5

[51] Int. Cl. .............................................. G11c 11/40

[58] Field of Search .................. 340/173 R, 173 B B

[56] References Cited

UNITED STATES PATENTS

| | | | |
|---|---|---|---|
| 3,331,058 | 7/1967 | Perkins | 340/178 BB |
| 3,432,812 | 3/1969 | Elfant | 340/173 BB |
| 3,444,526 | 5/1969 | Fletcher | 340/173 BB |
| 3,585,607 | 6/1971 | Dehaan | 340/173 BB |
| 3,588,830 | 6/1971 | Duda | 340/173 BB |
| 3,714,637 | 1/1973 | Beausoleil | 340/173 BB |
| 3,715,735 | 2/1973 | Moss | 340/173 BB |

*Primary Examiner*—Terrell W. Fears

*Attorney, Agent, or Firm*—Thomas F. Galvin

[57] ABSTRACT

A monolithic memory which uses both good chips and partially defective chips. For a selected group of chips, for example those mounted on an array card, the defects are limited to the same sector of each chip. When an address signal corresponds to the address of the defective chip sector, logic circuitry translates the address signal to an address at an all-good chip. The data is then written into or read out of the good chip sector instead of a defective chip sector. Provision of a programmable circuit on each array card allows sets of chips, each set having defects in a different sector, to be mounted on different array cards, thereby insuring profitable usage of substantially all partially defective chips.

15 Claims, 13 Drawing Figures

MONOLITHIC MEMORY USING PARTIALLY DEFECTIVE CHIPS

CROSS REFERENCE TO RELATED APPLICATIONS

Application Ser. No. 076,917, filed Sept. 30, 1970, now U.S. Pat. 3,714,637, now Pat. 3,781,826 and application Ser. No. 198,869, filed Nov. 15, 1971, both of which are entitled "Monolithic Memory Utilizing Defective Storage Cells".

Application Ser. No. 198,870 now Pat. 3,765,001 filed Nov. 15, 1971, entitled "Address Translation Logic Which Permits a Monolithic Memory to Utilize Defective Storage Cells".

Application Ser. No. 156,637, now Pat. 3,735,368 filed June 25, 1971, entitled "Full Capacity Monolithic Memory Utilizing Defective Storage Cells".

All of the applications are in the name of William F. Beausoleil.

BACKGROUND OF THE INVENTION

1. Field of the Invention

This invention relates to monolithic memories used for data storage and computers.

2. Description of the Prior Art

Monolithic memory circuits are initially formed on a silicon wafer which has been cut into chips. The chips are then assembled onto substrates which are packaged as integrated circuit modules. The latter are then soldered onto printed circuit cards.

In the production of monolithic chips, a large number are partially defective in that they have defects confined to a particular sector of the chip, for example a particular quarter or octant of the chip area. Moreover, due to the manufacturing processes involved, these defects are often not random in nature but tend to occur in a particular sector. Until recently, these partially defective chips have been rejected, resulting in a low yield.

The above cited related applications disclose various arrangements for constructing memories utilizing partially defective chips or modules containing less than a full quota of non-defective chips. Although the systems have enjoyed commercial success, they require relatively large amounts of translating logic and corresponding hardware on the storage card to avoid the addressing of cells in the defective sectors. In addition, the referenced patent applications envision the use of chips having different defective areas on the same array card. However, if the distribution of failing sectors of the chips is not random, the sector with the minimum amount of failures would be the limiting factor in the ability to make use of defective chips.

Other methods for utilizing partially defective chips have been proposed in the prior art. For example, error correction codes have been used to correct words in which certain bits were stored in defective cells. This method is disadvantageous in that it reduces the reliability of the memory by decreasing the effectiveness of the error correction technique.

Another method for utilizing partially defective chips involves wiring the chip during production so as to bypass the defective cells. This method is not economically feasible for monolithic memories.

SUMMARY OF THE INVENTION

It is an object of the present invention to economically make use of partially defective chips in a memory which would be otherwise unusable.

It is a further object of this invention to easily reconfigure a memory card to use chips which are defective in any particular sector.

It is yet another object of the present invention to achieve the capability of readily interchanging memory cards containing all-good chips with cards containing partially defective chips and all-good chips, with different cards containing chips having defects in different particular sectors.

These and other objects of the invention are achieved by grouping the defective chips into sets wherein the defects are limited to the same sector of each chip. Each memory array card has mounted thereon sets of chips having defective areas in the same sectors as well as a set of chips having no defective sectors. In general, if each chip contains N sectors, one of which is defective in the partially defective chips, then one all-good chip is provided on the card for each N partially defective chips.

Logic is provided between the memory address register and the chip array whereby an address signal which corresponds to the address of the defective chip sector is translated to an address of an all-good chip.

Programmable means, in the form of a jumper circuit mounted on each array card, allows sets of chips having defects in a different sector to be mounted on different array cards, as well as the utilization of cards containing only all-good chips. The same sector appears defective no matter which sector is actually defective. This feature allows a wide ranging interchangeability of cards in a monolithic memory as well as the use of a high percentage of the total number of defective chips coming from the production line, even where the distribution of failing sectors is not random.

DESCRIPTION OF THE PREFERRED EMBODIMENT

Figure 1A:
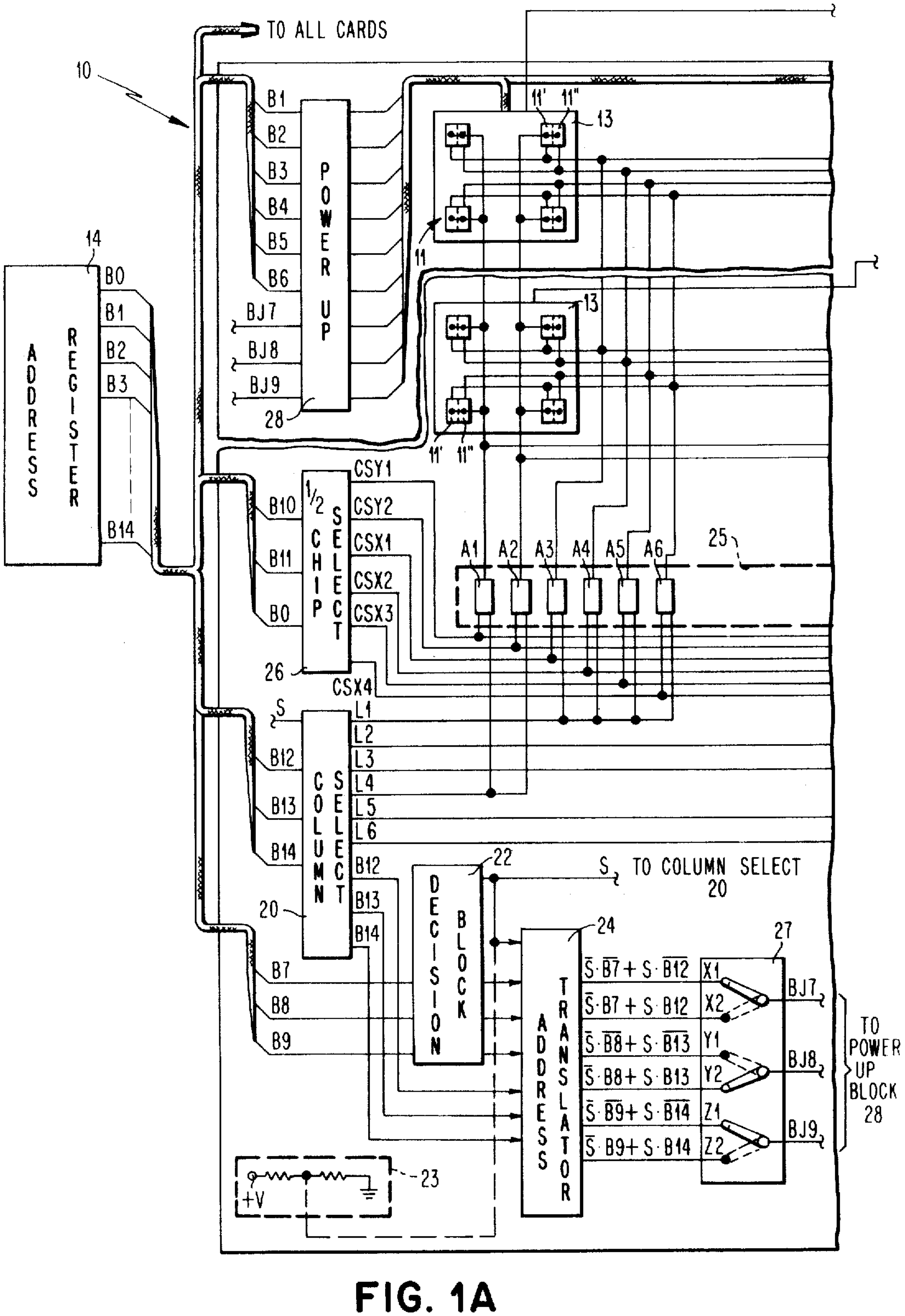
FIGS. 1A and 1B are schematic diagrams of a monolithic memory embodying the present invention.
Figure 1B:
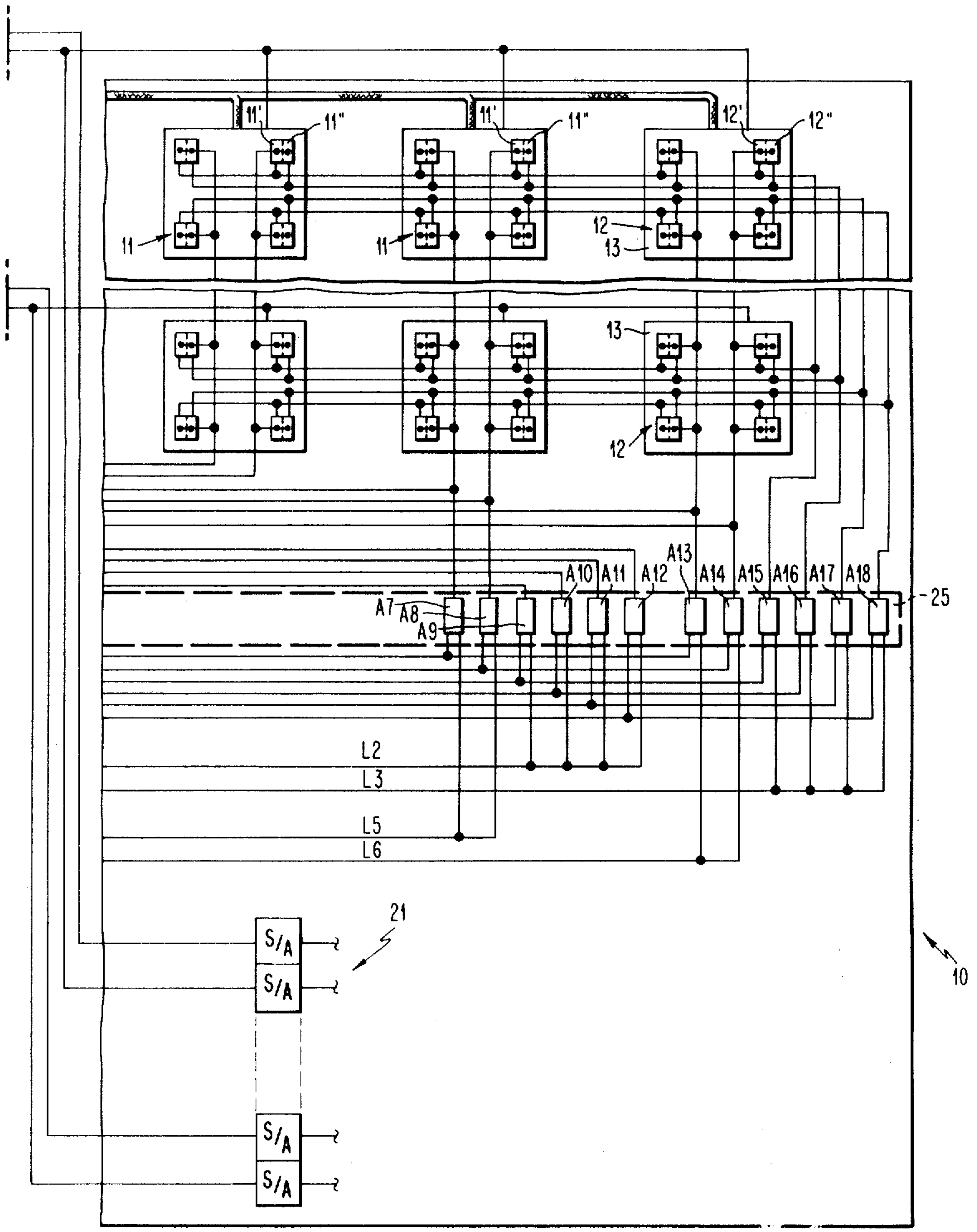

Referring now to FIGS. 1A and 1B there is shown a schematic diagram of a monolithic memory embodying the present invention. The memory comprises a plurality of storage cards 10 which are mounted on a memory board (not shown). EAch card 10 has a storage capacity of 32,768 words by 4 bits. Only one such card is shown for clarity of illustration, although there are preferably eighteen such cards mounted on the board to provide a 32K word memory having 72 bits per word. The memory is addressed by means of an address stored in address register 14 from which extend 15 address lines denoted as BO, B1, ..., B14. All address signals are buffered or powered to drive all storage cards 10. Mounted on each card 10 are a plurality of columns of modules 13 upon which are mounted, in turn, partially defective chips 11. Card 10 also contains another single column of modules 13 on which are mounted non-defective (all-good) chips 12. In the present arrangement, each chip 11 contains an array of 1024 addressable storage locations, amounting to 4096 locations per module 13. There are eight columns by four rows of modules, each containing four partially defective chips 11. One octant of each partially defective chip 11 contains inoperative or otherwise defective storage locations and is therefore unusable. It is most important that the same octant, say octant 7, within each chip 11 on a particular card 10 be the defective octant. In order to compensate for these defective octants, one additional column of modules 13 are provided which contain non-defective chips 12. Other memory cards 10 may contain defective chips having defects in a different octant, say octant 2, as well as all-good chips. Still other cards 10 may comprise only all-good chips.

The invention is not limited to chips having defective octants. For example, chips having defective quarter sectors could be utilized, although two columns of non-defective chips would be needed in that case.
are separately addressed. Such an array has been de-
chip actually comprises a pair of memory arrays which are separately addressed. Such an array has been described in U.S. Pat. No. 3,508,209, B. Agusta et al., which is assigned to the same assignee as the present invention.

Thus, every chip 11 and 12 actually appears to the system as two separately addressed arrays, which will be termed hereafter as ½-chips. For clarity a ½-chip is denoted in FIGS. 1A and 1B by the numerals 11'-11'' and 12'-12'', for the partially defective and non-defective chips, respectively. As will become clearer after reading this specification, the present invention is not limited to the particular type or arrangement of semiconductor device used.

The 15 address lines from register 14 drive all cards 10 in the following manner: lines B1 through B6 address bit decoders fabricated within each array in chip 11 to select one of 64 columns of storage locations on each ½-chip array in chip 11'. Lines B7, B8 and B9 address word decoders to select one of eight rows of storage locations. Address lines B0, B10 and B11 are decoded in ½-chip select decoder 26 to select one of the eight ½-chips 11' on each module 13. Address lines B12, B13 and B14 are initially decoded in column select decoder 20 to select one of eight columns of modules 13 containing chips 11. A ½-chip of 512 bits on each module 13 is full-selected by a combination of one of two CSY lines and one of four CSX lines emanating from ½-chip select circuit 26. Bit B10 selects the CSY line and bits BO and B11 select the CSX line. When there is a coincidence between the ½-chip select address and the module column address, then the same relatively positioned ½-chip on each module 13 in a four module column is simultaneously selected and powered up for a four-bit "read" or "write" cycle. This occurs on all storage cards 10.

As already noted, address lines B7, B8 and B9 initially select a particular row sector of the ½-chip structure. In the present preferred embodiment, these row sectors are octants of the chip and it is one of these octants which is defective on each of the defective ½-chips 11' and 11''. Referring again to FIG. 1, the octant select address lines B7, B8 and B9 are input from register 14 to decision block 22. This block determines if the defective octant on the chips are being addressed and generates a signal "S" or "$\overline{S}$", depending on whether a defective octant is called for by the system or not.

As previously stated, the selected column of array modules called for by the system is determined by decoding bits B12, B13 and B14. However, if a defective octant on a chip 11 is addressed, as idicated by the signal S=$\overline{B7}$.$\overline{B8}$.$\overline{B9}$, the data is fetched or stored in an all-good chip 12. This is accomplished via output S from the decision block 22 which, in conjunction with column address lines B12, B13 and B14, are decoded in column select block 20 to address the ninth column of all-good chips rather than the first eight columns of partially defective chips.

Address translator 24 has inputs from the decision block 22 indicative of the states of bits B7, B8 and B9 and from the column select block 20 indicative of the states of bits B12, B13 and B14. Translator 24 is a means for selecting the address of an octant in an all-good chip 12 which corresponds to the address of a defective octant selected by address register 14. There are two possible distinct outputs on each of the six output lines from translator 24. In the event that a defective octant is addressed, then the S signal appears and column select bits B12, B13 and B14 generate signals on the octant address lines BJ7, BJ8 and BJ9 through jumper block 27. These signals operate through the row decoder in an all-good chip to address the octant which corresponds to the defective octant called for by Register 14.

In the event that one of the seven non-defective octants in a partially defective chip 11 is addressed, then the $\overline{S}$ signal appears and octant select bits B7, B8 and B9 generate signals on lines BJ7, BJ8 and BJ9 to select the addressed octant in normal fashion.

Jumper block 27 is a programmable means which is wired individually on each card to insure that a down level on each of the address lines B7, B8 and B9, i.e., a logical $\overline{B7}$.$\overline{B8}$.$\overline{B9}$, always represents the defective octant of storage locations in each chip 11. No matter which octant in the chip is actually defective, the address $\overline{B7}$.$\overline{B8}$.$\overline{B9}$ represents the defective octant; and that address is avoided. Instead the signals are routed to a corresponding octant on an all-good ½-chip 12' or 12'' on the array card 10.

The present invention also contemplates utilizing only all-good chips on some of the storage cards at the discretion of the designer and depending on production yields. With the present invention this can be accomplished quite easily with an absolute minimum of design changes. If each of the chips on the card is nondefective, only eight columns of modules, rather than the nine which are shown in FIGS. 1A and 1B, are provided. In that event, the S output of decision block 22 is permanently wired to a tie-up circuit 23 shown in phantom lines and has the permanent value $\bar{S}$. By this means column select block 20 acts as a standard three-to-eight decoder and can never select a ninth column of chips.

Figure 2:
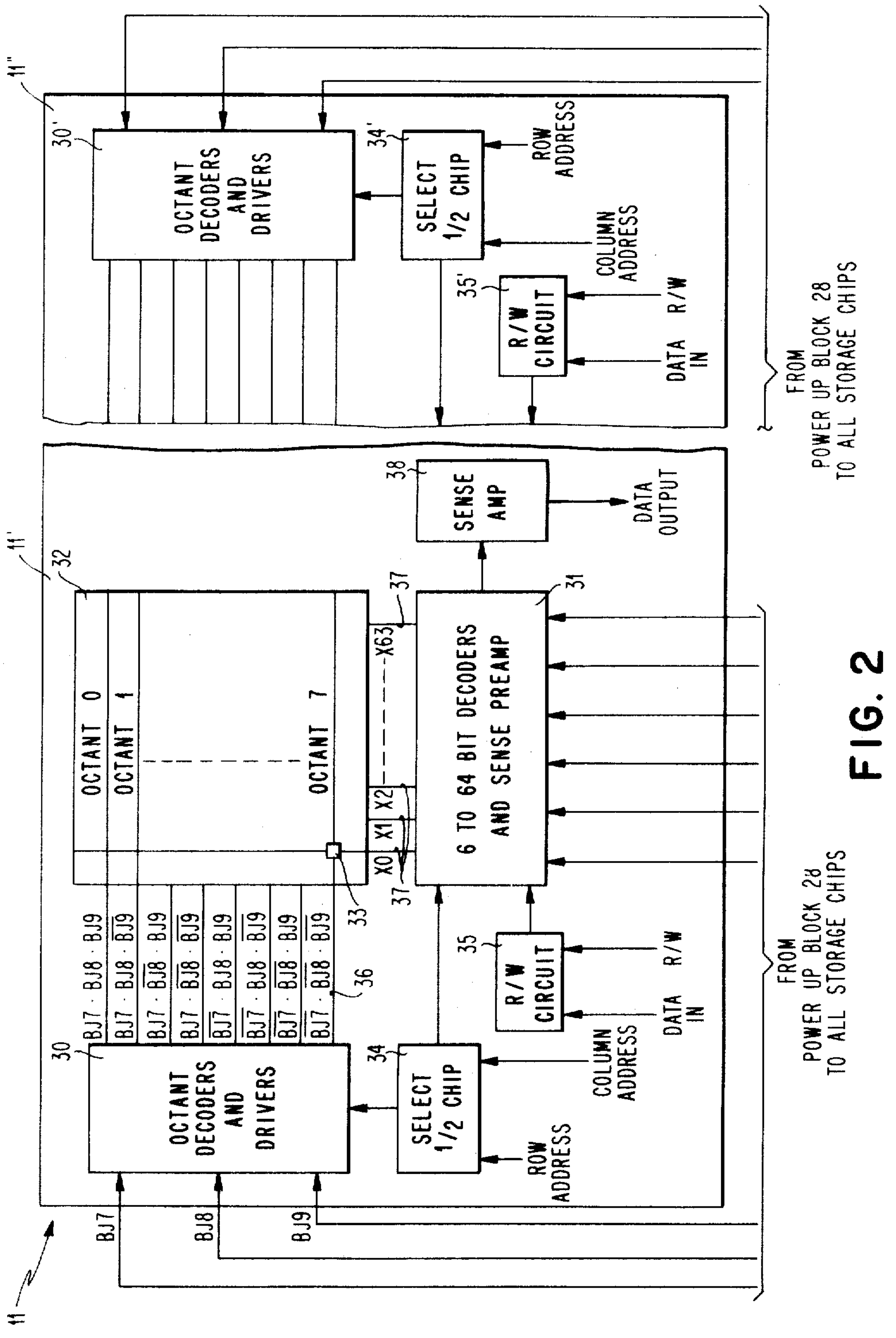
FIG. 2 is a schematic diagram showing one chip of the memory of FIGS. 1A and 1B.

As previously mentioned, each partially defective chip 11 and all-good chip 12 is divided into two ½-chips containing 512 storage cells, each cell being adapted to store one bit of information. FIG. 2 is a schematic diagram of a chip. For purposes of brevity, only a partially defective chip 11 is illustrated; however a non-defective chip 12 is exactly the same except for the fact that one of the octants in chip 11 is defective and not used.

Referring to FIG. 2, the active selection of a cell 33 can take place only with the coincidence of the row and column address as determined by select ½-chip circuit 34. When this occurs, at chip 11', it is switched to the high power state and the octant (word) decoders 30 and the bit decoders 31 are activated. Once the chip has been selected, then the cell 33 is decoded by address lines B1, B2, ..., B6 and BJ7, BJ8 and BJ9 from the power-up circuits 28 (FIG. 1A).

These nine address lines go to all partially defective ½-chips 11' and 11'' as well as all non-defective ½-chips 12' and 12'' on all storage cards 10. Three of the seven address lines go to the word decoder 30 on the chip. The three addresses are decoded and powered to select one of eight word lines 36 going to the matrix 32 of storage cell 33. Each output from the word decoder 30 drives a row of 64 cells 33.

Six of the nine address lines are sent to a bit decoder 31 on the chip to decode one of 64 sense preamps on the chip. The sense preamp selected in turn powers one of the 64 bit lines 37. Each bit line 37 is connected to a column of eight cells 33. At the intersection of the selected word line 36 and the selected bit line 37, one cell 33 will be selected on each module 13 in a selected column on each card 10. These four bits per card are addressed in parallel in the present embodiment.

Data is stored in the storage cell 33 by the coincidence of the "write" pulse and "data" signal into the read/write circuit 35. This coincidence conditions one of the 64 sense preamps 31 which have been decoded by the six address lines and data is directed into the decoded storage cell 33 via the selected bit line 37.

When the read pulse is present at the R/W circuit 35, the sense preamp 31 detects the condition of the storage cell 33 and directs the signal to a sense amplifier 38 on the ½-chip 11'. The sense amplifier 38 in turn sends the data out to a final sense amplifier 21 which is mounted on the storage card 10. The details of the decoders, sense pre-amplifiers and amplifiers and read/-write circuitry are well-known to those skilled in the art and do not relate to the present invention. Therefore, these details have not been shown specifically in the drawings.

The arrangement of 8 rows by 64 columns of cells 33 in FIG. 2 is given by way of example only. It might be desirable to have arrays with more rows and fewer columns; and these are within the scope of the present invention. For example, in the present embodiment each octant contains only a single row of cells. However, in a 16 + 32 array, each octant would contain two rows of cells, thereby requiring four row address bits, say B6, B7, B8 and B9. Nevertheless, only three of the four address bits would be exercised by Decision Block 22 and Address Translator 24.

The disclosed 32K-by-4 bit memory made from sets of chips having defects in a particular sector and a set of all-good storage chips is interchangeable with a 32K-by-4 bit memory made only of all-good chips. It is also interchangeable with a memory made from sets of chips having defects in a different sector and a set of all-good chips. The operation of the memory is the same. The only differences exist in the number of storage modules 11 required on the storage card 10, the wiring of jumper block 27 and the use of a tie-up circuit 23.

In making a monolithic memory in accordance with the present invention, the first step consists in fabricating a plurality of integrated circuit chips, each having an array of 1024 memory cells therein. The chips are then tested to determine which cells in the array are defective. The chips are then sorted into a first sort having all-good cells and eight other sorts having defective cells only in a respective octant of each ½-chip. Those chips having defects in more than one octant in each of the ½-chip arrays are rejected. Some of these might, however, be used in a ¾-good chip memory system. The chips are then assembled onto modules 13 in the usual manner known in the art. The partially defective chips having defects in a particular octant are assembled onto modules forming the first eight columns on the card 10. Each module contains four partially defective chips, or eight partially defective ½-chips, with the defects located in the same octant of each ½-chip.

The usual capacity of each storage module is ⅞ths of the module's capacity. However, all circuits, including the defective ones, are still powered and use the same current as the all-good modules. To obtain the same usable storage capacity per card, more modules are required. Thus, the logic disclosed in the present application is designed to operate with a combination of 32 3584-bit storage modules and four 4096-bit storage modules to obtain a 131,072-bit storage card. The logic used to drive storage cards 10 is contained on a separate card and drives all the storage cards in parallel. It is therefore only necessary to explain the operation of a single storage card to understand the operation of the entire memory.

Figure 3:
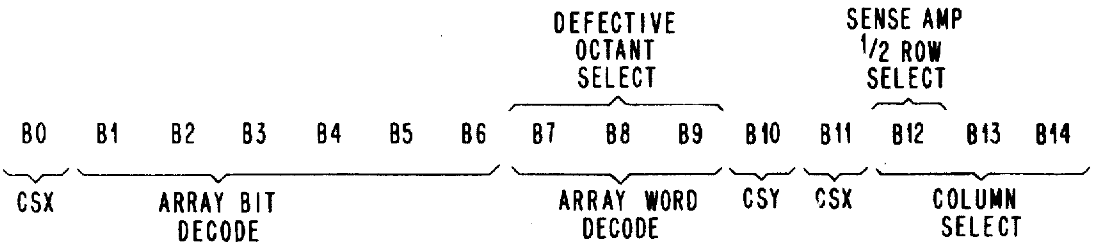
FIG. 3 is a diagram of the address field used in the preferred embodiment of the present invention.

To address a 32K-by-4 bit card, a 15 bit binary address field is required. These 15 addresses are subdivided into three categories: three ½-chip select addresses, three column select addresses, and nine cell select addresses. As illustrated in FIG. 3, the three ½-chip select addresses are designated BO, B10 and B11; the three column-select addresses are designated B12, B13 and B14 and the nine cell-select addresses are designated B1, B2, ...., B9.

The three ½-chip select address bits BO, B10 and B11 decode one of eight ½-chips on each module.

As shown in Table I, bit B10 selects one CSY line in select circuit 26 and bits B11 and BO select one CSX line to full-select a correspondingly located ½-chip on each module 13 in all columns, including the column of non-defective chips.

TABLE I

| COLUMN SELECT BLOCK 22 INPUTS | | | OUTPUTS |
|---|---|---|---|
| $\overline{B10}$ | — | — | CSY 1 |
| B10 | — | — | CSY 2 |
| — | $\overline{B11}$ | $\overline{BO}$ | CSX 1 |
| — | B11 | $\overline{BO}$ | CSX 2 |
| — | $\overline{B11}$ | BO | CSX 3 |
| — | B11 | BO | CSX 4 |

These function the same as in the case of an all-good memory. An explanation can be given for a single module 13 and will apply to all modules in the same manner. Therefore, all further explanation will be given only for a single module and the address bits BO, B10 and B11 will not be further discussed.

The nine cell select addresses go all chips of all modules on all cards. These addresses decode one of 512 cells on a ½-chip. Six of the nine address bits go to the storage card without being affected by the logic shown in FIGS. 6 and 7. As will be discussed further, only three cell select address bits are important to the invention, namely addresses B7, B8 and B9. At the output of the jumper block 27, these addresses become BJ7, BJ8 and BJ9, which are used to decode the octant of the chip that is being addressed.

The particular final sense amplifier 21 (FIG. 1B) which is used is determined by the condition of bits B12 and bits B7, B8 and B9. Each row of modules is served by a set of two sense amplifiers, an upper and a lower. If a non-defective octant has been selected and B12 is at a true or complement level, the lower or upper sense amplifier, respectively, of the two which serve each row is selected. On the other hand, if a defective octant has been selected, the lower sense amplifier is used, irrespective of the condition of B12.

Figure 4:
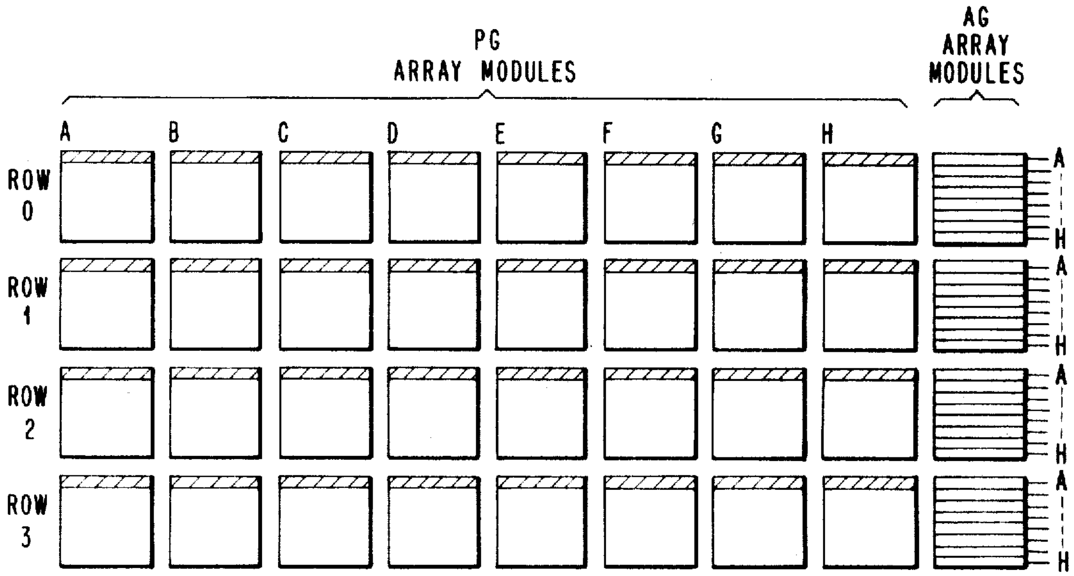
FIG. 4 is a diagram showing sets of modules containing chips which have defects in a particular octant and a set of modules containing all-good chips laid out on a storage card.

FIG. 4 illustrates the layout of modules containing chips which have defective octants, denoted PG modules and the modules containing all-good chips, denoted AG modules. Each PG module contains eight defective octants, one each per ½-chip. These defective octants have a corresponding non-defective octant in a ½-chip on an AG module, i.e., information which would usually be stored in or fetched from the defective octant is instead in the corresponding non-defective octant. In the preferred embodiment as illustrated in FIG. 4, each row of eight PG modules is served by the AG module in that row. Because of the way the CSX and CSY lines select the ½-chips on a module, including the AG module (see Table 1), each AG ½-chip serves the same relatively positioned ½-chip on each module in the row.

Figure 6:
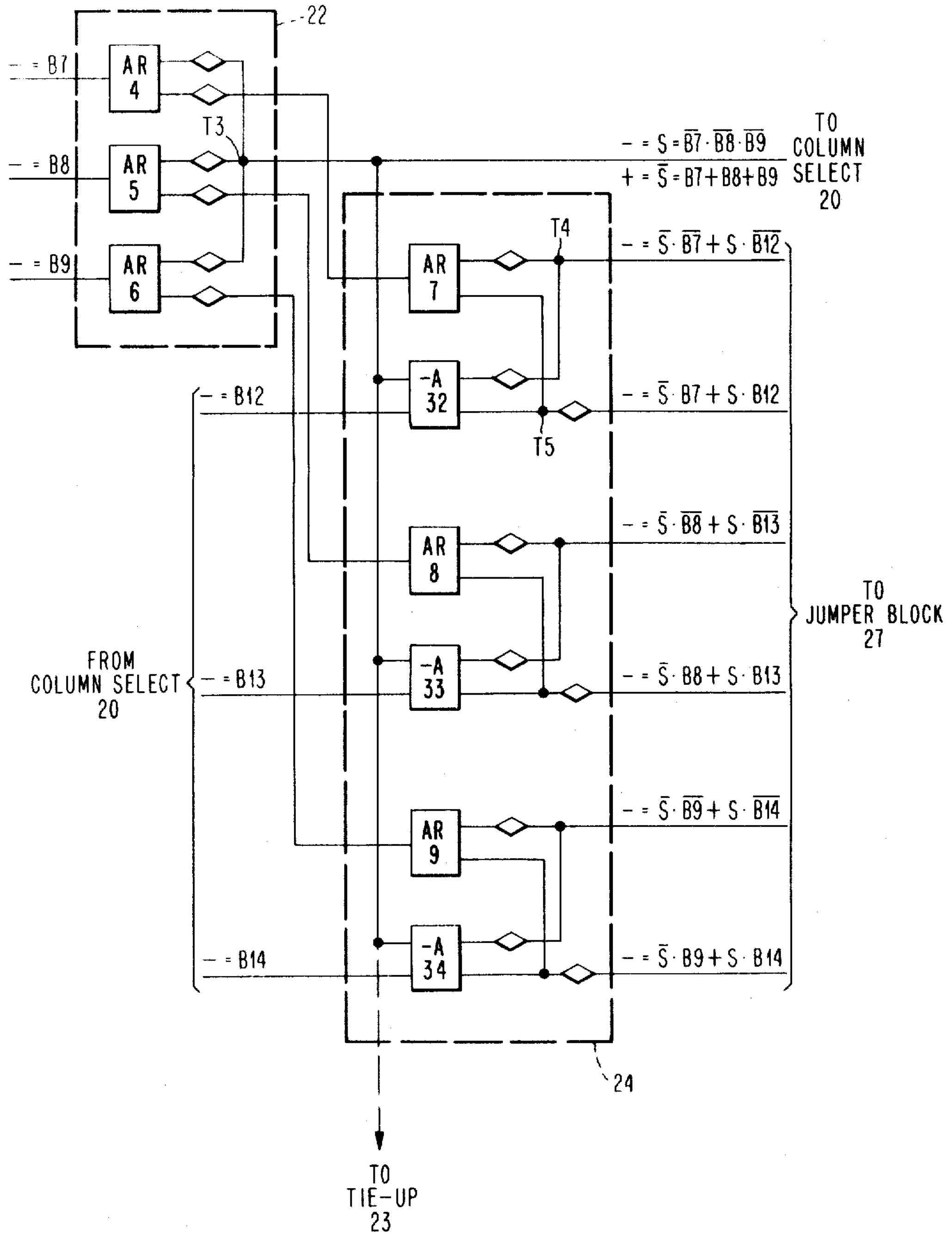
FIG. 6 is a logic block diagram of the decision block and address translator shown in FIG. 1.
Figure 7:
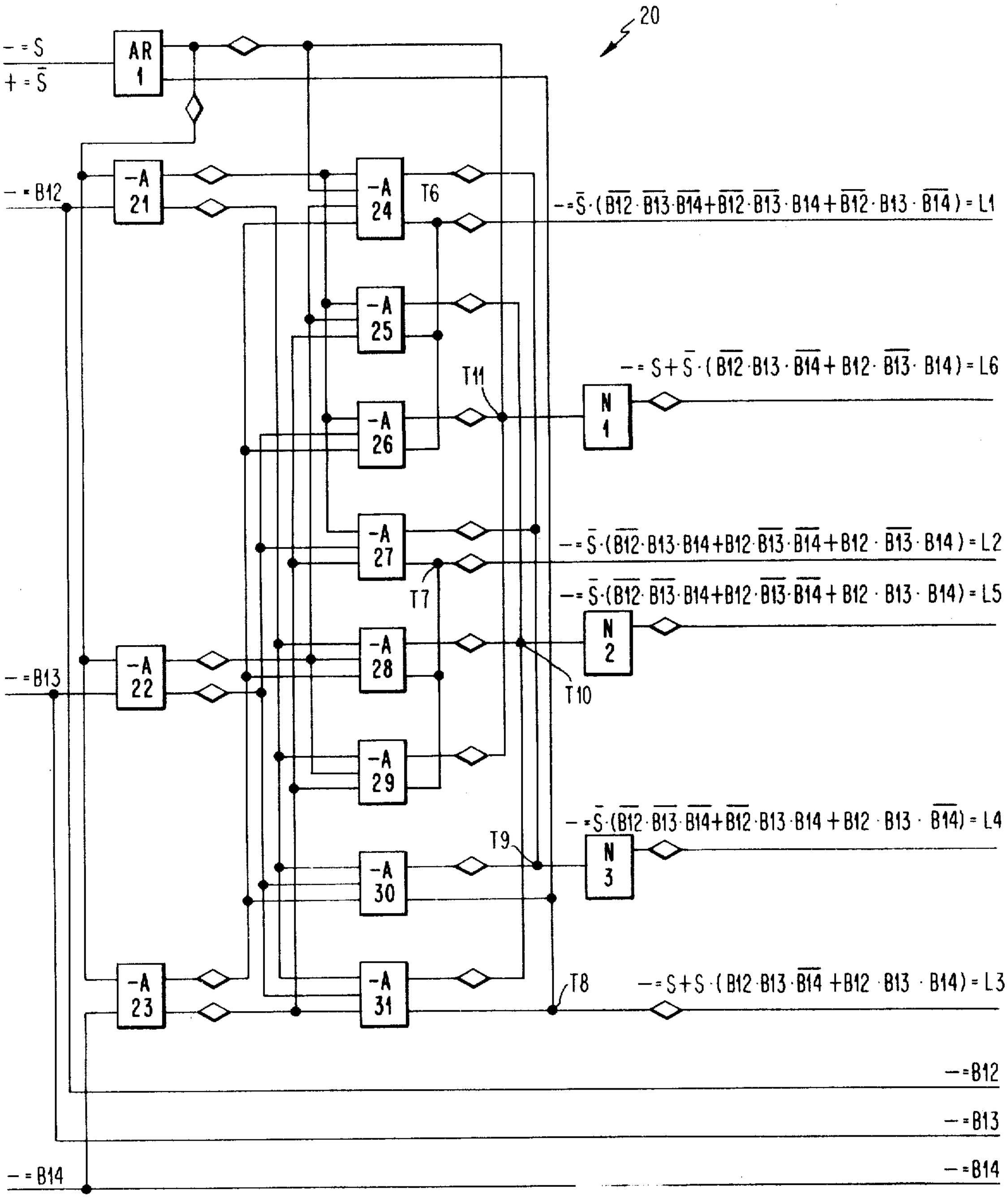
FIG. 7 is a logic block diagram of the column select circuit shown in FIG. 1.

FIGS. 6 and 7 show the logic circuitry for converting the incoming addresses so as to select one of the all-good chips when a defective octant is addressed. The logic circuitry in these figures is in the form of negative logic, by which is meant that a negative input voltage to a gate represents the true signal and a positive input voltage represents the complement signal. Negative logic has found great use in the emitter-coupled logic families using NPN-type transistors; it is familiar to computer circuit and systems designers. Those interested in a further general discussion are referred to the text by G. A. Maley entitled *Manual of Logic Circuits*, Prentice-Hall Publishers, 1970, Chapter 5.

Figure 5A:
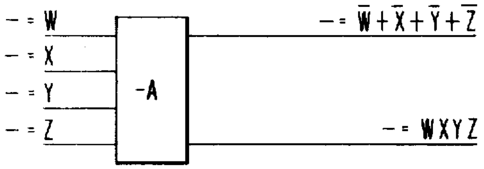
FIGS. 5A–5D illustrate the basic circuits utilized in the logic circuitry of the present invention.

FIG. 5A shows the basic logic block, the negative AND (NAND) block used to form negative logic circuits.

Using the NAND circuit, a true signal, i.e., a negative signal on all input lines W, X, Y and Z yields the NAND output on the upper level of the gate, i.e., $$-\!\!=\overline{W.\ X.\ Y.\ Z} = \overline{W} + \overline{X} + \overline{Y} + \overline{Z}.$$

Figure 5B:
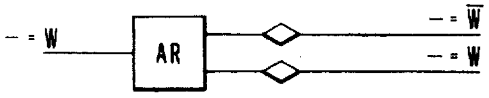
Figure 5C:
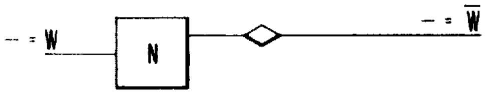
Figure 5D:
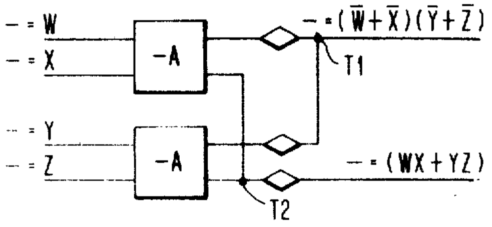

The lower output of the NAND block of FIG. 5A is the inverse of the upper, i.e., $-\!\!=W.\ X.\ Y.\ Z.$ The remaining FIGS. 5B, 5C and 5D are variations formed from the NAND gate. FIG. 5B represents a gate, denoted AR, having a single input and the inverted output on the upper level and the true input on the lower level. FIG. 5C is an inverter with a single input and a single output.

FIG. 5D is a combination of two NAND gates for achieving DOT functions. Because the blocks are preferably formed from emitter-coupled logic, which may be externally collecter dotted to perform the AND function and internally emitter dotted to perform the OR function, the diamond symbol◇ is used to indicate where the dotting occurs. In FIG. 5D terminal T1 indicates that the dotting occurs after the emitter output, whereas terminal T2 indicates that the collectors are dotted. Thus, the output at terminal T1 is the negative dot AND function and the output at T2 is the negative dot OR function as indicated.

The circuitry shown in FIGS. 6 and 7 is built up using solely the negative AND logic blocks illustrated in FIGS. 5A–5D.

FIG. 6 shows the logic blocks which comprise decision block 22 and address translator 24 of FIG. 1A. Decision block 22 generates the S output as a function of address bits B7, B8 and B9. As previously noted, the addressing of the system is arranged so that a complement level on each of these bits, i.e., a logical $\overline{B7}$. $\overline{B8}$. B9 indicates that a defective octant in the partially defective chips has been selected.

Decision block 22 comprises a set of three AR blocks having upper outputs connected as a three-way negative dot AND at terminal T3. A negative, or true, output S at terminal 3 occurs when all inputs are positive, i.e., $\overline{B7}$. $\overline{B8}$. $\overline{B9}$; conversely, a complement $\overline{S}$ occurs when any input is negative, i.e. =B7+B8+B9.

Address translator 24 functions as a means for translating the address of a defective chip octant to another address in a corresponding octant of an all-good chip in response to the signal S. Octant select bits B7, B8 and B9 are used in address translator 24 to select an octant on a partially defective chip 11 if the octant selected is one of the seven non-defective octants. On the other hand, if the defective octant of the chip has been selected, then the bits S, B12, B13 and B14 into address translator 24 select one of the octants on the all-good chip which corresponds to the defective octant addressed by the system.

This result is shown on the output lines of address translator 24 which illustrates the correspondence between bits B7, B8 and B9 and bits B12, B13 and B14, respectively. If the $\overline{S}$ signal occurs, indicating that a non-defective octant in a partially defective chip has been selected, then the output lines are indicative of the condition of address bits B7, B8 and B9. However, if the S signal is present, indicating that the defective octant on a partially defective chip has been selected, then the address trying to select the defective octant is routed to the corresponding octant via column select bits B12, B13 and B14.

The translating of the octant and column select bits is performed by six basic logic blocks which are, for practical purposes, three identical circuits: AR7/-A32, AR8/-A33 and AR9/-A34, each of which act independently on bits B7–B12, B8–B13 and B9–B14, respectively. Thus a description of the operation of one of the sets will suffice to explain the operation of the other two.

Considering the combination AR7/-A32, the input to AR7 is derived from the lower output of AR4 in decision block 22. As previously discussed with respect to FIG. 5B, the lower output of AR4 is the true indication of bit B7, i.e., a negative level of bit B7 on the input of AR4 yields a negative level on the output and vice-versa. The upper and lower inputs on block-A32 are S and B12, respectively. The outputs of blocks AR7 and -A32 are connected in the dot configuration as illustrated previously in FIG. 5D, whereby terminal T4 performs the negative dot AND function and terminal T5 performs the negative dot OR function, to yield the output $\bar{S}.\ \overline{B7} + S.\ \overline{B12}$.

As previously discussed, if signals $\overline{B7}$. $\overline{B8}$. $\overline{B9}$ are transmitted from address register 14, then the decision block 22 transmits the signal S to column select block 20. Referring to FIG. 7, the signal S or $\bar{S}$ in conjunction with the column select address signals B12, B13 and B14 are used to select one of the nine columns of modules on the card. If the card contained only nondefective chips in a standard eight column array, then only bits B12, B13 and B14 would be required to perform the standard three-out-of-eight decoding. However, a card containing partially defective chips as well as a column of all-good chips requires the S bit to select the all-good chips in the ninth column of modules when a defective octant in one of the partially defective chips is addressed.

Column select block 20 has six outputs: L1, L2, L3, L4, L5 and L6 which are used in conjoint pairs to select the proper column of modules. As indicated with respect to FIGS. 1A and 1B, two of the six outputs perform a column select through the AND gates in decoder 25. Table II illustrates the particular conjunctions of the outputs L1, ... L6 from column select block 22 which act to select a particular column. The column identification is consistent with that illustrated in FIG. 4.

TABLE II

| Column Selected | Column Select Output | Output Function |
|---|---|---|
| A | L1, L4 | $\bar{S}\cdot\overline{B12}\cdot\overline{B13}\cdot\overline{B14}$ |
| B | L1, L5 | $\bar{S}\cdot\overline{B12}\cdot\overline{B13}\cdot B14$ |
| C | L1, L6 | $\bar{S}\cdot\overline{B12}\cdot B13\cdot\overline{B14}$ |
| D | L2, L4 | $\bar{S}\cdot\overline{B12}\cdot B13\cdot B14$ |
| E | L2, L5 | $\bar{S}\cdot B12\cdot\overline{B13}\cdot\overline{B14}$ |
| F | L2, L6 | $\bar{S}\cdot B12\cdot\overline{B13}\cdot B14$ |
| G | L3, L4 | $\bar{S}\cdot B12\cdot B13\cdot\overline{B14}$ |
| H | L3, L5 | $\bar{S}\cdot B12\cdot B13\cdot B14$ |
| AG | L3, L6 | S S |

Each of the first eight ccolumns of partially defective chips is selected by a unique combination of column select bits B12, B13 and B14; the appearance of the signal S causes only the ninth column of all-good chips to be selected through signals L3. L6.

The basic circuits used to perform the column select function are those described with respect to FIGS. 5A–5D. The outputs L1, L2 and L3 are the result of a negative dot OR function of the lower outputs of circuits -A24/-A25/-A26, at T6, -A27/-A28/-A29 at T7 and AR1/-A30/-A32, at T8 respectively. Because of the similarity of these circuits, a description of the generation of an output on one line, e.g. output L1 will suffice as the description of the output of lines L2 and L3.

The inputs to circuit A24 are, in order: $S + \overline{B12}$, $\bar{S}$, $\bar{S} + \overline{B13}$, $S + \overline{B14}$. The inputs to circuit A25 are $S + \overline{B12}$, $S + \overline{B13}$ and $\bar{S}.\ B14$. The inputs to block A26 are $S + \overline{B12}$, $\bar{S}.\ B13$ and $\bar{S}.\ B14$. The negative dot OR function generates an output at terminal T6 as follows:

$$(1)\ L1=[(S+\overline{B12})\ (\bar{S})\ (\bar{S}+\overline{B13})\ (S+\overline{B14})\ ]+](S+\overline{B12})\ (S+\overline{B13})\ (\bar{S}.\ B14)\ [+](S+\overline{B12})\ (\bar{S}.\ B13)\ (\bar{S}.\ \overline{B14})\ ]$$

A straightforward logical manipulation of this equation yields the output function for L1 as shown in FIG. 7.

The outputs L4, L5 and L6 are the result of a negative dot AND function of the upper outputs of circuits -A24/-A27/-A30 at T9, -A25/-A28/-A31 at T10 and AR1/-A26/-A29 at T11, respectively. The outputs from terminals T9, T10 and T11 are inverted by inverters N3, N2 and N1, respectively, to yield the outputs L4, L5 and L6.

Considering the generation of output L4, the inputs to circuit A27 are $S+\overline{B12}$, $\bar{S}.\ B13$ and $\bar{S}.\ B14$. The inputs to circuit A30 are $\bar{S}.\ B12$, $\bar{S}.\ B13$ and $S+\overline{B14}$. The outputs to circuit A24 have already been described. At terminal T9, where the negative dot AND function is performed, the output is:

$$(2)\ \overline{[(S+\overline{B12})\ (\bar{S})\ (S+\overline{B13})\ (S+\overline{B14}) + (S+\overline{B12})\ (\bar{S}.\ B13)\ (\bar{S}.\ B14) + (\bar{S}.\ B12)\ (\bar{S}.\ B13)\ (S+\overline{B14})\ ]}$$

by logical manipulation this reduces to:

$$(3)\ \overline{\bar{S}\ (\overline{B12}.\ \overline{B13}.\ \overline{B14}) + \bar{S}.\ \overline{B12}.\ B13.\ B14) + \bar{S}(B12.\ B13.\ \overline{B14})}.$$

The inversion of this function by inverter N3 results in the output function L4 as shown in FIG. 7. The outputs L5 and L6 are generated in a similar fashion and an explanation of these functions is thought to be superfluous, as any skilled circuit or system designer can appreciate their formation.

The six output lines from address translator 24 are connected to the inputs of jumper block 27. The six inputs X1, X2, Y1, Y2, Z1 and Z2 of the jumper block are connected to the outputs BJ7, BJ8, and BJ9 depending upon which of the particular numbered octants in each chip is defective. It will be recalled that a particular octant, say octant 2, is defective in each of the partially defective chips on a particular card 10 of the memory. However, it will usually be desirable to mount on another card chips which have defects in a different octant, say octant 4. Generally speaking, in the production of the chips the location of defects in the chips are more or less on a random basis, although certain sectors of the chips may exhibit defects more than other sectors due, for example, to a defect in a mask. The present invention takes account for either an entirely random distribution of defects throughout a chip lot or for a non-random distribution by the provision of the programmable jumper block 27.

Table III lists the connections which are made within the jumper block depending on which octant is defective.

TABLE III

| Defective Octant | Connections In Jumper Block |
|---|---|
| 0 | X1, Y1, Z1 |
| 1 | X1, Y1, Z2 |
| 2 | X1, Y2, Z1 |
| 3 | X1, Y2, Z2 |
| 4 | X2, Y1, Z1 |
| 5 | X2, Y1, Z2 |
| 6 | X2, Y2, Z1 |
| 7 | X2, Y2, Z2 |
| None | X1, Y1, Z1 |

These connectors assure that the signal $\overline{B7}$. $\overline{B8}$. $\overline{B9}$ is selective of the octant which is defective. Alternatively speaking, the jumper assures that no other combination of B7, B8 and B9 causes a defective octant to be selected. For example, if octant 4 were defective and the connections in jumper block 27 were X2, Y1, and Z1 then the true level on the $\overline{B7}$ line of address translator 24 would generate a complement level on line BJ7 from the jumper block 27. Similarly, the true outputs on line $\overline{B8}$ and $\overline{B9}$ on translator 24 would generate a true level on lines BJ8 and BJ9 from the jumper block. Thus the function on the octant address lines is: $\overline{BJ7}$. BJ8. BJ9. This corresponds to the address signals for octant 4 in the wiring between decoder 30 and chip 32. (FIG. 2). However, this octant will not be selected because the address translator causes a corresponding octant in the all-good chips to be selected, as the S signal rather than the $\overline{S}$ signal actually appears on the output lines of address translator 24.

It will be noted that the connections in jumper block 27 for cards in which no chips are defective is the same as for cards in which the chips have a defective octant O. This arrangement is operative because, as previously noted, tie-up circuit 23 will maintain the S line at a positive level, i.e., at $\overline{S}$, in cards in which there are no defective chips.

Operation

For purposes of illustration, assume that octant 2 in each ½-chip 11' and 11'' on the PG modules on a given card are defective. During the assembly of the memory card, the jumper circuit is wired X1, Y2, Z1 as specified in Table III. This wiring assures that the signals $\overline{B7}$, $\overline{B8}$ and $\overline{B9}$ transmitted from address register 14 in response to a command from the central processor will attempt to select the defective octant 2 on a particular ½-chip on each module 13 on the card to fetch (or store) four bits of data.

For example, the signal $\overline{B7}$: $\overline{B8}$. $\overline{B9}$. B10. B11 $\overline{BO}$. $\overline{B12}$. $\overline{B13}$. $\overline{B14}$ indicates the attempted selection of octant 2 of the ½-chips 11'' in the upper right corner of each module in the first column (A) on card 10. Bits B1 through B6 can be ignored in this example. The signals input to decision block 22, $\overline{B7}$, $\overline{B8}$, $\overline{B9}$ cause the generation of the output S which is transmitted to the inputs of column select block 20 and address translator 24. Thus, the signals input to address translator 24 are S, $\overline{B7}$, $\overline{B8}$, $\overline{B9}$, $\overline{B12}$, $\overline{B13}$, $\overline{B14}$; and the signals input to column select block 20 are S, $\overline{B12}$, $\overline{B13}$, $\overline{B14}$. These inputs to column select 20 cause the generation of outputs on lines L3 and L6 only, as was previously described with reference to FIG. 7. Lines L3 and L6 then select the ninth column in the array, that is, the column of all-good chips.

The inputs to address translator 24 generate outputs S. $\overline{B12}$, S. $\overline{B13}$ and S. $\overline{B14}$. Because of the wiring of jumper block 27, line BJ7 is at a true level, line BJ8 is at a complement level and line BJ9 is at a true level; in logical representation: BJ7. $\overline{BJ8}$. BJ9. These signals are transmitted to the octant decoder and driver of the all-good ½-chip 12'' in the upper right-hand corner of the first module in the ninth column. As can be seen in FIG. 2, the signal BJ7. $\overline{BJ8}$. BJ9 causes the selection of octant 2 in the all-good chip, which is the corresponding octant to octant 2 of the partially defective ½-chip in the first column of partially defective modules.

Using the same example, the signal $\overline{B7}$. $\overline{B8}$. $\overline{B9}$. B10. B11. $\overline{BO}$. $\overline{B12}$. $\overline{B13}$. B14 indicates the attempted selection of octant 2 of the ½-chips 11'' in the upper right corner of each module in the second column (B) on card 10. However, as in the previous case, lines L3 and L6 are activated from column select block 20 to choose the ninth column in array.

The inputs to address translator 24 generate outputs S. $\overline{B12}$, S. $\overline{B13}$ and S. B14. Because of the wiring of jumper block 27 line BJ7 is at a true level, line BJ8 is at a complement level and line BJ9 is also at a complement level; in logical representation: BJ7. $\overline{BJ8}$. $\overline{BJ9}$. These signals are transmitted to the octant decoder and driver of the all-good ½-chip 12'' in the upper right-hand corner of the first module in the ninth column. The signal BJ7. $\overline{BJ8}$. $\overline{BJ9}$ causes the selection of octant 3 in the all-good chip. The operation applies to each of the other similarly located chips and the eight columns of partially defective chips. This address translator 24 utilizes the column select bits B12, B13 and B14 to perform the octant selection in the non-defective chips, assuring that the defective octants in the partially defective chips have one and only one corresponding non-defective octant in the all-good chips.

Figure 8:
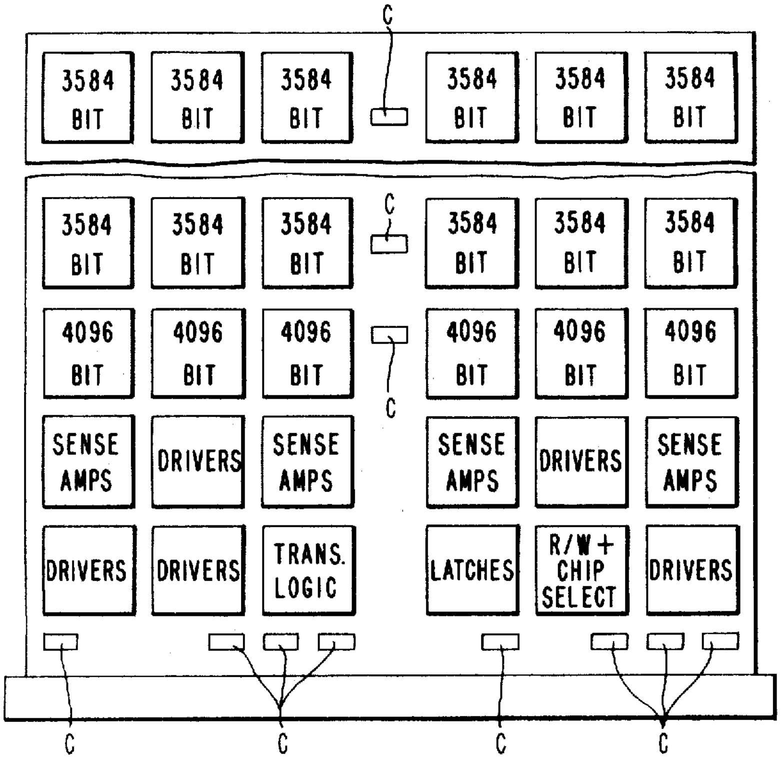
FIG. 8 illustrates a storage card having modules containing sets of ⅞ths good chips and a set of all-good chips.
Figure 9:
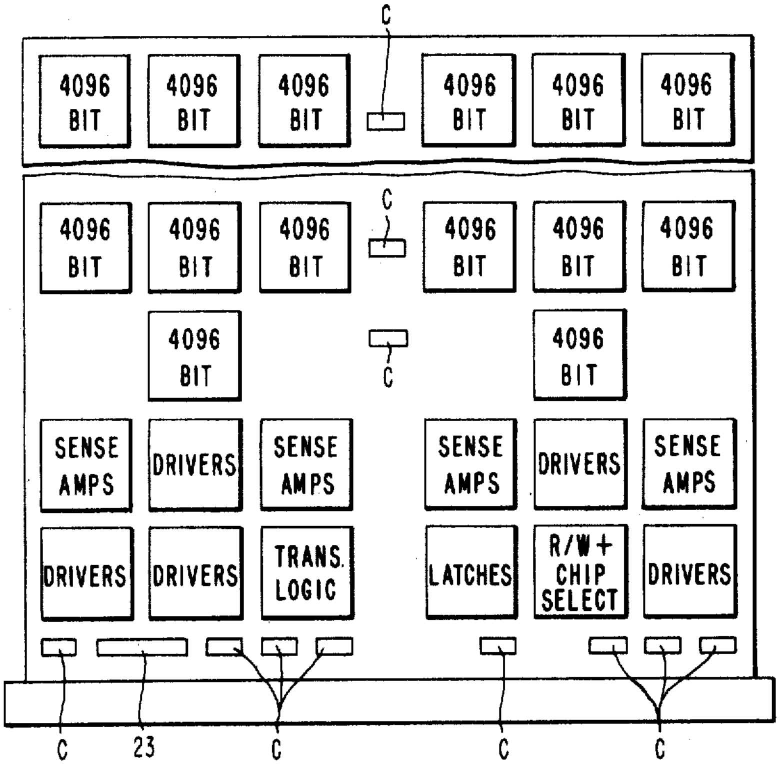
FIG. 9 illustrates a storage card having modules containing only all-good chips.

FIGS. 8 and 9 illustrate array cards on which are mounted PG modules and AG modules respectively. The same basic card can be assembled with either PG modules or AG modules. If the former the card contains 32 ⅞-good modules and four AG modules as shown in FIG. 8. The card also contains five interface driver modules for sense amp-bit driver modules, a single latch module, two logic modules and 16 capacitor packs C. The arrangement of an AG module card is essentially the same except that only 32 AG modules each containing 4096 bits are required and the tie-up circuit 23 is needed. The other circuitry is identical.

While the invention has been particularly shown and described with reference to a preferred embodiment thereof, it will be understood by those of skill in the art that the foregoing and other changes in form and details may be made therein without departing from the spirit and scope of the invention.

I claim:

1. A monolithic memory comprising:

a plurality of nondefective integrated circuit chips;

a plurality of partially defective integrated circuit chips, each having one or more defects in the same predetermined sector thereof;

each of said chips having an array of memory cells therein;

each of said memory cells having a respective address assigned thereto;

input means for signals addressing said cells; and means for converting the address signals corresponding to those cells in said defective sectors to new address signals corresponding to locations in said non-defective chips.

2. A monolithic memory as in claim 1 wherein said converting means comprises:
logic circuitry having inputs for signals corresponding to the addresses of the cells in the defective sectors of the partially defective chips and outputs for signals corresponding to the addresses of the cells in the non-defective chips.

3. A monolithic memory as in claim 2 wherein said logic circuitry comprises:
decision means responsive to certain ones of said addressing signals for signaling when a defective sector has been addressed;
means responsive to a signal from said decision means for selecting said plurality of non-defective chips when a defective sector has been addressed; and
translation means for translating the address of said defective sector to an address of an associated sector in a non-defective chip.

4. A monolithic memory as in claim 3 further comprising:
programmable means connected between said translation means and the chips for assuring that said certain ones of said addressing signals correspond to the address of a defective sector, irrespective of which one of the sectors in the partially defective chips is defective.

5. A monolithic memory comprising:
a plurality of integrated circuit chips, each of said chips having an array of memory cells divided into N sectors;
a particular one of said N sectors in each chip having defective cells;
said plurality of defective chips being an integral multiple of N;
a single non-defective chip for each N defective chips;
each of said memory cells having a respective address assigned thereto;
input means for signals addressing said cells; and
means for converting the address signals corresponding to those cells in said defective sectors to new address signals corresponding to location in said non-defective chips.

6. A monolithic memory comprising:
at least one storage card having mounted thereon a first set of nondefective integrated circuit chips and eight sets of integrated circuit chips having chips with defects only in the same respective octant of each chip;
each of said chips having an array of memory cells therein;
each of said memory cells having a respective address assigned thereto; and
means for converting the addresses of cells in said defective octants to addresses of cells in said first set of chips.

7. A monolithic memory comprised of at least one storage card, each card having mounted thereon:
a plurality of non-defective integrated circuit chips;
a plurality of partially defective integrated circuit chips, each having one or more defects in the same predetermined sector thereof;
each of said chips having an array of memory cells therein;
each of said memory cells having a respective address assigned thereto;
input means for signals addressing said cells; and
means for converting the address signals corresponding to those cells in said defective sectors to new address signals corresponding to locations in said non-defective chips.

8. A monolithic memory as in claim 7 wherein said converting means comprises:
logic circuitry having inputs for signals corresponding to the addresses of the cells in the defective sectors of the partially defective chips and outputs for signals corresponding to the addresses of the cells in the non-defective chips.

9. A monolithic memory as in claim 8 wherein said logic circuitry comprises:
decision means responsive to certain ones of said addressing signals for signaling when a defective sector has been addressed;
means responsive to a signal from said decision means for selecting said plurality of non-defective chips when a defective sector has been addressed; and
translation means for translating the address of said defective sector to an address of an associated sector in a non-defective chip.

10. A monolithic memory as in claim 9 further comprising:
programmable means connected between said translation means and the chips for assuring that said certain ones of said addressing signals correspond to the address of a defective sector, irrespective of which one of the sectors in the partially defective chips is defective.

11. A monolithic memory as in claim 7 wherein said predetermined sector is different on different ones of said cards.

12. A monolithic memory as in claim 11 further comprising:
programmable means for assuring that the same address signals from said input means correspond to the address of a defective sector, irrespective of which one of the sectors on said cards is defective.

13. A monolithic memory as in claim 7 wherein at least one card has mounted thereon a plurality of non-defective chips only and said at least one card has mounted thereon:
means for deactivating said converting means.

14. A method of making a monolithic memory of the type containing a plurality of integrated circuit chips, each having an array of memory cells therein, comprising the steps of:
testing said chips to determine which cells thereof are defective;
sorting said tested chips into a first sort having all-good cells and other sorts having defective cells in respective sectors of the chips; and
assembling said chips onto cards with a predetermined number of said first sort and predetermined number of one of the other sorts on a card.

15. A method of making a monolithic memory of the type containing a plurality of integrated circuit chips, each having an array of memory cells therein, comprising the steps of:
testing said chips to determine which cells are defective;
sorting said tested chips into a first sort having all-good cells and eight other sorts having defective cells only in a respective octant of the chips; and
assembling said chips onto cards, each card containing a single set of said first sort and eight sets of one of the other sorts.

* * * * *

UNITED STATES PATENT OFFICE

CERTIFICATE OF CORRECTION

PATENT NO. : 3,845,476

DATED : October 29, 1974

INVENTOR(S) : Robert F. Boehm

It is certified that error appears in the above-identified patent and that said Letters Patent are hereby corrected as shown below:

Column 3, line 37 "are seperately addressed. Such an array has been de-chip actually comprises a pair of memory arrays which are separately addressed"...should read..In the preferred embodiment of this invention, each chip actually comprises a pair of memory arrays which are separately addressed.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*